United States Patent
Kumar (10) Patent No.: US 7,373,168 B1
(45) Date of Patent: May 13, 2008

(54) POWER CONTROLLED FADING COMMUNICATION CHANNEL SYSTEM

(75) Inventor: Rajendra Kumar, Cerritos, CA (US)

(73) Assignee: The Aerospace Corporation, El Segundo, CA (US)

( * ) Notice: Subject to any disclaimer, the term of this patent is extended or adjusted under 35 U.S.C. 154(b) by 683 days.

(21) Appl. No.: 11/034,170

(22) Filed: Jan. 12, 2005

(51) Int. Cl.
H04B 7/00 (2006.01)

(52) U.S. Cl. .................. 455/522; 455/68; 455/69; 455/115.3; 455/126; 455/127.1; 455/127.2

(58) Field of Classification Search .......... 455/522, 455/68, 69, 115.3, 126, 127.1, 127.2, 135, 455/226.3, 277.2, 296
See application file for complete search history.

(56) References Cited

U.S. PATENT DOCUMENTS

| | | | |
|---|---|---|---|
| 6,952,591 B2 * | 10/2005 | Budka et al. .............. 455/517 |
| 7,209,717 B2 * | 4/2007 | Okada et al. .............. 455/126 |
| 2002/0028675 A1 * | 3/2002 | Schmutz et al. ........... 455/424 |
| 2004/0097189 A1 * | 5/2004 | Bongfeldt et al. ............ 455/7 |
| 2004/0258024 A1 * | 12/2004 | Tiedemann et al. ........ 370/332 |
| 2006/0035660 A1 * | 2/2006 | Anderson .................. 455/522 |

* cited by examiner

Primary Examiner—Matthew Anderson
Assistant Examiner—Dominic E. Rego
(74) Attorney, Agent, or Firm—Derrick Michael Reid

(57) ABSTRACT

A power controller in a communication system adjusts the transmitted power level using adaptive prediction of channel fading for maintaining the power level for improved communications by using an adaptive nonlinear predictor that explicitly takes into account the propagation delay and channel fading where the transmitted power is determined on the basis of the measurement of the received power levels over the individual diversity branches for providing communication through a fading channel with effective performance equivalent to that of a channel without any signal fading.

14 Claims, 2 Drawing Sheets

UPLINK POWER CONTROL DUPLEX COMMUNICATION SYSTEM

UPLINK POWER CONTROL DUPLEX COMMUNICATION SYSTEM

FIG. 1

FILTER AND ADAPTIVE PREDICTOR

FIG. 2

POWER CONTROLLED FADING COMMUNICATION CHANNEL SYSTEM

STATEMENT OF GOVERNMENT INTEREST

The invention was made with Government support under contract No. F04701-00-C-0009 by the Department of the Air Force. The Government has certain rights in the invention.

FIELD OF THE INVENTION

The invention relates to the field of communication systems. More particularly, the present invention relates to power control of communication signals for improved reception in fading channel communication systems.

BACKGROUND OF THE INVENTION

Existing closed loop power control algorithms in the Code Division Multiple Access (CDMA) and Universal Mobile Telephone System (UMTS) ignore the roundtrip delay incurred in the measurement of the received signal power. Such an assumption of zero round trip delay may be valid when the round trip delay is negligible in comparison to the inverse of the channel fading bandwidth. However, in the case of satellite channels such a condition is not satisfied. The round trip delay for geostationary satellites, for example, may be in the range of 250 msec to 500 msec, including any terrestrial delay, for a single hop or two-hop system. When compared to the inverse of the channel fading delay in the range of 1.0 to 10.0 sec, corresponding to the bandwidth in the range of 0.1 to 1.0 Hz, such a delay is not negligible. Hence, any power control algorithm based on such a zero delay assumption will not have satisfactory performance. Power control is necessary for frequency division multiple access (FDMA) and time division multiple access (TDMA) systems to control adjacent channel interference and mitigate unexpected interference caused by a near-far problem. In these systems, power control is needed to improve the quality of voice delivered to a user. However, in CDMA systems that are self-interfering, the capacity of the system depends directly on the power control and an accurate power control mechanism is needed for maximizing the number of users that can operate simultaneously in the system. Improved power control can also save the amount of transmitted power of the mobile station (MS), which increases the life of the battery.

In case of fading channels, diversity-combining techniques are generally employed to improve system performance. For example, in case of the CDMA systems, implicit diversity gain is exploited with the help of a rake receiver. In such a diversity system employing either an explicit or an implicit diversity, the power control in the terrestrial systems is based on the estimated power level at the diversity combiner output. In CDMA systems the power control on the reverse link, for example, is based on a combination of open loop control along with a closed loop correction implemented in the base station and the MS. For open loop probing on the access channel with closed loop correction inactive, the mobile station transmits the first probe signal at an output power level, defined by a mean output power in dBm is equal to k minus the mean receive input power in dBm plus 0.5, times, the nominal power in dB plus 0.5, times, the initial power in dB. The mean power is referred to a nominal CDMA channel bandwidth of 1.23 MHz and k, nominal power, and initial power are system parameters. The initial power parameter is any margin, positive or negative, above the required level. When the initial power is zero, then the nominal power is the correction to provide the correct received power at the base station. Essentially the power control, in both open loop and closed loop, is based on the assumption of identical channel gain on both the reverse and forward link, thus ignoring both the roundtrip propagation delay and the difference in the transmission frequency on the two links. Subsequent probes in an access probe sequence are sent at an increasing power level until a response is obtained from the base station. The initial transmitted power in the reverse traffic channel is at the power level given by the mean TX output power equation plus all the access probe corrections.

Uncontrolled differences in the forward and reverse channels, such as opposite fading that may result due to the frequency difference plus mismatches in the mobile station's transmit and receive chains result in the transmit power, which is different than the desired level. To reduce these residual errors, a close loop control is used wherein the mobile station measures the received $E_b/N_0$ which is the bit energy to total noise power spectral density ratio, and transmits this information to the base station on the reverse link. The base station compares the performance measure against a threshold and based on the difference between the two sends a correction signal to the mobile station inserted in the forward data steam. The MS then corrects his transmit power on the basis of this correction information.

The closed loop correction in the CDMA systems ignores the round trip delay in comparison to the inverse of the channel fading bandwidth. For example, typically the fading bandwidth for the terrestrial cellular communication networks may be of the order of 50.0 Hz having a time constant of 20.0 msec compared to a round trip delay smaller than 0.1 msec for a cell radius of 10 Km and thus such assumption is satisfied. However, in the case of satellite channels with a roundtrip delay of 500 to 600 msec such an assumption is not valid even when the fading bandwidth is less than 1 Hz.

In the UMTS system, two loops for power control are involved. The inner loop is based on a bandwidth of about 1500 Hz with a period of 0.66 msec, measures the received signal to interference ratio and compares to the desired signal to interference ratio. The loop period is much higher compared to the roundtrip delay and thus the roundtrip delay is not too important in the loop design. This loop is similar to the closed loop in the CDMA system. An outer loop measures a service metric such as the frame error rate and adjusts the desire signal to interference ratio to account for any unmodeled uncertainties. The outer loop bandwidth is in the range of 10.0 to 100.0 Hz. Similar to the CDMA power control, a satisfactory operation of the UMTS system power control requires that the roundtrip delay be negligible compared to the channel fading bandwidth and the loop bandwidth. However, in the case of satellite channels such a condition is not satisfied. In case of the satellite channels, the round trip delay may vary between 250 to 550 msec, depending upon whether a single hop or two hop system is used, compared to 1.0 μsec to 100 μsec variation in UMTS system. When compared to a fading channel bandwidth of 0.1 to 1.0 Hz with a time constant of 1.0 to 10.0 seconds, the roundtrip delay is not negligible and hence the power control approach will not work satisfactorily. It is therefore necessary to take into account the roundtrip propagation delay explicitly in the design of the power control algorithm. A satisfactory operation of both the CDMA and the UMTS power control algorithm requires that the roundtrip delay be negligible compared to the channel fading bandwidth and the loop bandwidth. When compared to a fading channel bandwidth and time constant, the roundtrip delay is not negligible and hence the prior power control algorithms may not work satisfactorily. These and other disadvantages are solved or reduced using the invention.

SUMMARY OF THE INVENTION

An object of the invention is to provide a system for improving the reception of the communication signals.

Another object of the invention is to provide a system for improving the reception of the communication signals by adjusting the power level of a transmitted signal.

Yet another object of the invention is to provide a system for improving the reception of the communication signals by adjusting the power level of a transmitted signal communicated through a fading channel.

Still another object of the invention is to provide a system for improving the reception of the communication signals by adjusting the power level of a transmitted signal by predicting the amount of fading in a fading channel.

The present invention is directed toward a power control system in a communication system for adjusting the power level of a transmitted signal through prediction of the amount of the amount of fading in a fading channel. A power control algorithm explicitly takes into account the propagation delay by including an adaptive N-step ahead nonlinear predictor. The fading channel power gain in dB is modeled in terms of a parameterized nonlinear model with memory. The model parameters are adaptively estimated by a recursive least squares algorithm from which a power controller derives the required prediction of the channel power gain and the requisite transmitted power level. The system can be used for improved reception through satellite communication channels where the roundtrip propagation delay are incurred when obtaining the measurements of the received power level at the transmitter site for the purpose of controlling the transmitted power. Such a roundtrip delay is significant when compared to the inverse of the channel fading bandwidth. Thus, the power control algorithms take into account such a delay for use with communication systems where the roundtrip delay is relatively significant. The power control algorithm is based on an adaptive nonlinear predictor that explicitly takes into account a long propagation delay. The transmitted power is determined on the basis of the measurements of the received power levels over the individual diversity branches for improving performance. Using a predictive and adaptive algorithm, the overall performance is shown to be very close to the performance of the ideal additive white Gaussian noise (AWGN) channel without any fading. For example, when the received power from all diversity branches is combined, as in case of equal gain diversity combining, and compared to the power level required for the nonfading channel to achieve the same probability bit error, the residual loss due to fading is about one dB for a probability of bit error equal to $10^{-6}$ or higher. These and other advantages will become more apparent from the following detailed description of the preferred embodiment.

DETAILED DESCRIPTION OF THE PREFERRED EMBODIMENT

Figure 1:
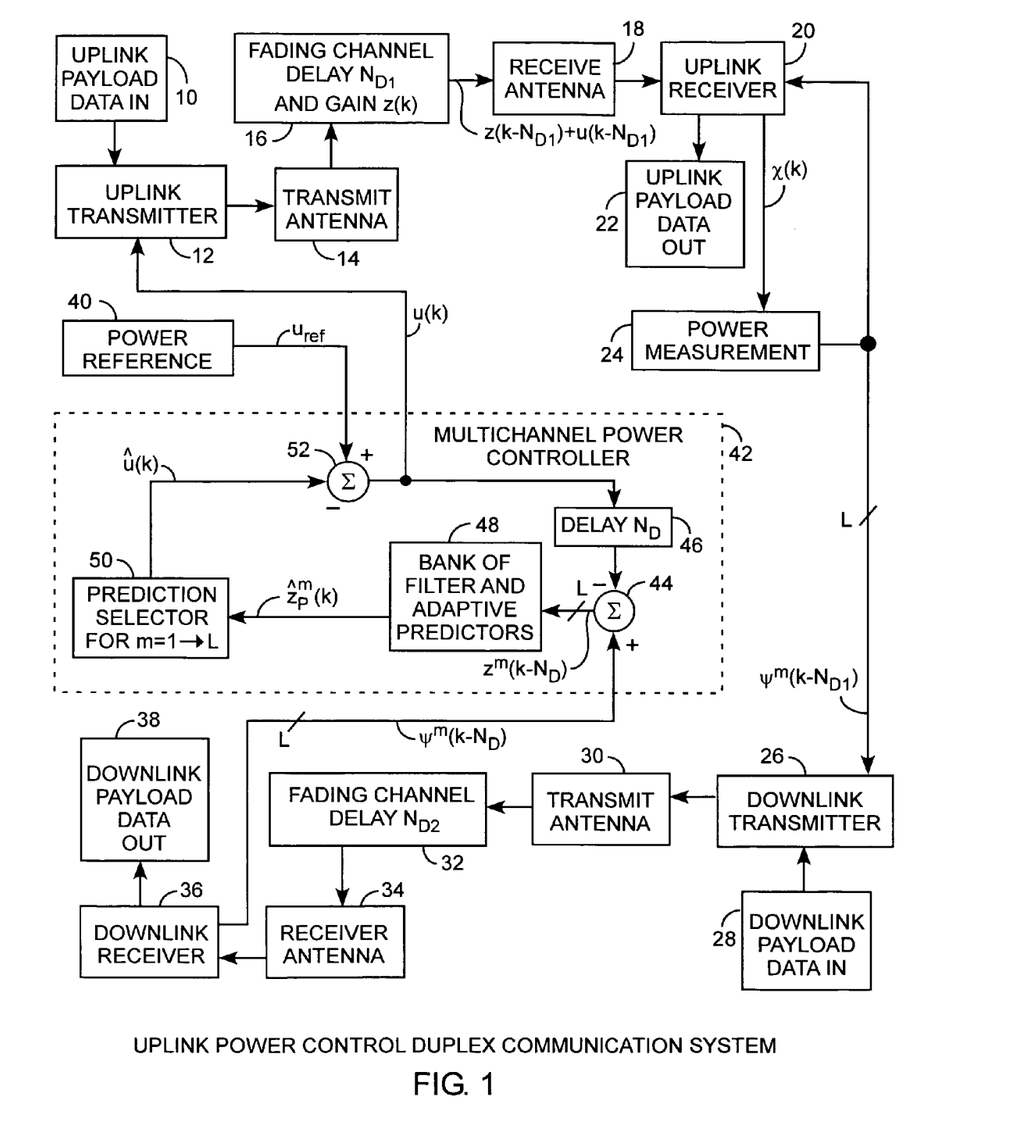
FIG. 1 is a block diagram of an uplink power control duplex communication system.

An embodiment of the invention is described with reference to the figures using reference designations as shown in the figures. Referring to FIG. 1, a duplex communication system may be used for communicating signals through fading channels, such as a satellite communication channel, wherein the fading may result due to the ionospheric scintillation or multipaths in a terrestrial, marine, or aeronautical environment. Input uplink payload data 10 fed to an uplink transmitter 12 driving an uplink transmit antenna 14 for communicating a transmit signal through a fading channel 16 having a gain of z(k) and a delay of $N_{D1}$. The uplink transmitter 12 receives an adaptive reference signal u(k) for adjusting the power level of the transmitted signal. The uplink data 10 is an information signal that is coded and modulated by a carrier frequency signal with the resulting RF signal amplified in power and transmitted by the uplink transmit antenna 14 for transmission on the uplink. The received RF signal $z(k-N_{D1})+u(k-N_{D1})$ after propagating over the fading channel 16 is received by a receive antenna 18 that inputs the transmit signal to an uplink receiver 20. The uplink receiver 20 makes available the information signal after demodulation and decoding processes as an uplink output data 22. The information signal is thus recovered and may undergo further processing and switching onboard the satellite or may simply be transmitted over the downlink as in the case of a repeater type of satellite. After recovering the information signal, a power measurement 24 is performed on the received demodulated signal $\chi(k)$. The power measurement 24 may be a function performed inside the uplink receiver 20. The power measurement 24 performs the function of estimating signal quality of the received signal. The estimation of the signal quality can be the power level, or some other measure related to the signal power level such as the received bit energy to noise power spectral density ratio ($E_b/N_0$), or the frame error rate.

When the channel 16 exhibits significant frequency selective fading where the transmitted signal bandwidth is higher than the coherence channel bandwidth, it may be possible to separate the signal components arriving via different paths at the receiver antenna. For example, in a code division multiple accessing (CDMA) communication system, the signal separation is achieved with a rake receiver, which separates various multipath signals utilizing the properties of the spreading codes. After separation of these communicated signals, the receiver aligns the phases and recombines the separated signals in a coherent manner so as to achieve a better signal-to-noise power ratio (SNR). Such an improvement in the SNR is termed the implicit diversity gain. For implicit diversity, the power measurement 24 measures power over individual L multipaths. The power measurement signals $\psi^m(k-N_{D1})$ for the L different implicit diversity branches, where m is equal one through L, are transmitted as part of the downlink signal communicating the payload information on the downlink.

The downlink signals communicate composite information including the payload data and the power measurement signals $\psi^m(k-N_{D1})$ to a downlink transmitter 26 that codes, modulates, and amplifies in power the downlink signals through a downlink transmit antenna 30. In some systems, a single antenna may be used as both the receive antenna 18 and transmit antenna 30 using a duplexer, not shown. The RF signal radiated by the transmit antenna 30 propagates over the downlink fading channel 32 having a delay of $N_{D2}$. The downlink signal is received by a receiver antenna 34 that may be a ground receiver antenna. The received RF signal is received by the receive antenna 34 and fed into a downlink receiver 36 that demodulates and decodes the composite downlink signal for providing downlink output payload data 38. The received power measurement signals $\psi^m(k-N_D)$ of the composite received signals is fed to a multichannel power controller 42, which controls the power level of the uplink transmitter 12 by providing the adaptive power reference signal u(k) such that the power received by the uplink receiver 20 remains close to a reference power level $u_{ref}$ that is an input to the power controller 42 in the presence of unknown channel fading and significant roundtrip delay from the uplink transmitter 12 and downlink receiver 36.

The power controller 42 receives the power measurement signal $\psi^m(k-N_D)$ and subtracts the adaptive power reference signal u(k) that is delayed by an $N_D$ delay 46 from the power measurement signal $\psi^m(k-N_D)$ for providing an adaptive power measurement signal $z^m(k-N_D)$ to a bank of filter and adaptive predictors 48. The predictors 48 provide L average adaptive power measurement signals $\hat{z}_p^m(k)$ where m is equal to one through L. A prediction selection 50 selects one of the L average adaptive power measurement signals $\hat{z}_p^m(k)$ as a selected adaptive power reference signal û(k). The selected adaptive power reference signal û(k) is fed into an adder 52 for adjusting the reference level $u_{ref}$ for providing the adaptive reference u(k) to the uplink transmitter. As such, there is a roundtrip closed loop adaptive adjustment to the power level of the transmitted signal for maintaining the power level received in the uplink receiver 20 for improved signal reception in the presence of fading multipath channels 16 and 32 and in the presence of large roundtrip times.

Figure 2:
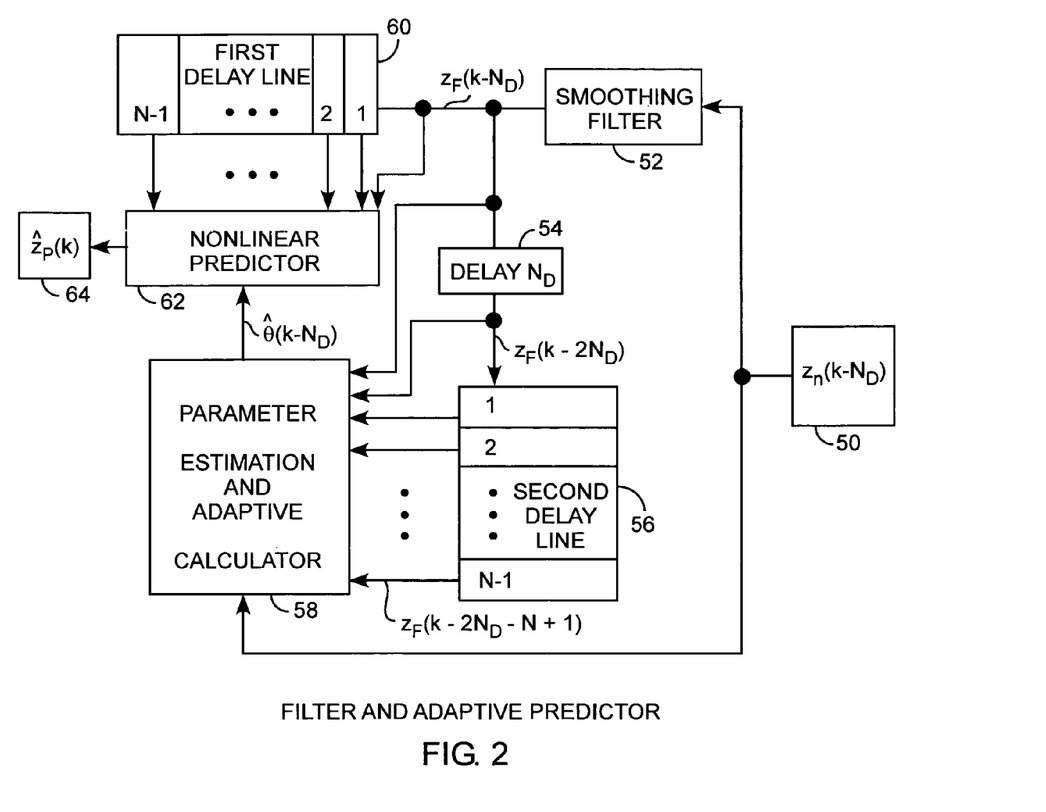
FIG. 2 is a block diagram of filter and adaptive predictor.

Referring to FIGS. 1 and 2, and more particularly to FIG. 2, a filter and adaptive predictor is an exemplar predictor of the predictors 48 that would include L predictors. An average adaptive power measurement signal $z_n(k-N_D)$ 50 is fed into a smoothing filter 52. The smoothing filter 52 is used to reduce the measurement noise incurred in the power measurement 24. The smoothing filter 52 may be a first order or higher order filter for providing a filtered adaptive power measurement signal $z_F(k-N_D)$ that is fed into an $N_D$ delay 54, a parameter estimation and adaptive calculator 58, and a first delay line 60. The $N_D$ delay 54 provides an $N_D$ delayed filter signal $z_F(k-2N_D)$ that is fed into a second delay line 56 and the calculator 58. The calculator 58 also receives the average adaptive power measurement signal $z_n(k-N_D)$ 50. As such, the parameter estimation and adaptive calculator 58 receives $z_F(k-2N_D)$ through $z_F(k-2N_D-N+1)$ filtered signals and provides a parameter vector signal $\hat{\theta}(k-N_D)$ to the nonlinear predictor 62. The nonlinear predictor 62 provides the average adaptive power measurement signal $\hat{z}_p(k)$. The predictor is modeled in terms of a nonlinear model involving up to three-degree terms along with an exponential term. The unknown parameters in the predictor model are estimated using a recursive weighted least squares algorithm. The predictor derives the parameter vector signal $\hat{\theta}(k-N_D)$ by minimizing the difference between the average adaptive power measurement signal $z_n(k-N_D)$ and a nonlinear prediction of $z(k-N_D)$ on the basis of $z_F(k-2N_D)$ through $z_F(k-2N_D-N+1)$ filtered signals using the recursive least squares algorithm.

The transmitted power is determined by the power controller 42 on the basis of the received power levels on all of the individual diversity channels. The power controller 42 makes it possible to eliminate any outliers almost completely wherein an outlier is defined as an event causing an incorrect estimate of the predicted channel gain due to the presence of noise in the recursive least squares algorithm and leading to low power at the combiner output. When the power control system is based on the combiner output power at the receiver, any error in the determination of the required transmit power will result in an outlier and low power in the combined signal. However, when the diversity channels are power controlled on the basis of received power levels over individual diversity channels, at least one of the diversity channels will have sufficiently high power level with high probability so that the probability of an outlier is very small and the combiner output power does not become low with any significant probability. The power control is perfected by using the power measurement signals for the L different implicit diversity branches that are transmitted along with the payload information on the downlink by the transmitter 26 in the adaptive control of the transmit power level.

The system reduces the penalty due to fading to a negligible value, especially when some form of implicit or explicit diversity is available. Such a diversity may involve just a second channel whose average power may be only a fraction of the main channel average power and is for the purpose of removing any outliers left by the adaptive algorithm. For the CDMA systems such an implicit diversity is mostly available as the coherence bandwidth is generally smaller than the wideband CDMA signal bandwidth. Even in the absence of any diversity, the algorithm makes it possible to achieve a probability of bit error ($P_e$) in the range of $10^{-3}$ to $10^{-4}$ which is better than required for the coded systems with about 1 dB penalty compared to nonfading channels. Without the power control and even with full power triple diversity, there is a penalty of about 5 dB even for the high $P_e$. The results will be in between these cases if an inefficient power control algorithm is used. It is not feasible to have a $P_e$ in the range of $10^{-6}$ to $10^{-8}$ without an effective power control unless very high order diversity is available. In contrast, power control achieves a low $P_e$ with no penalty with L=3 and about 2 dB penalty for L=2. Similar results hold for various other situations in terms of diversity, and multiple accessing techniques.

Referring again to FIGS. 1 and 2, the term $u_{ref}$ in FIG. 1 denotes the reference power level, which is the desired power level at the receiver even in the presence of fading over the communication channel. The power controller is implemented using the adaptive predictor having an output u(k) that represents the power transmitted by the uplink transmitter during the kth sampling interval. For the purpose of power control, the sampled version of the unknown channel gain process is expressed in terms of dB scale as $z(k)=20\log(a_n(k))$ where $a_n(k)$ is the channel gain, i.e., $a_n(k)$ is the ratio of the real envelopes of the received and transmitted signals at the discrete time instance $kT_s$ where $T_s$ is the sampling interval for the update of the power control algorithm and k is any integer k. The channel gain process z(k) is then modeled by a general Z(k) nonlinear model $Z(k)=\alpha_1 z(k-1)+ \ldots +\alpha_m z(k-m)+g(z(k))+w(k)$, where $\alpha_1, \alpha_2, \ldots, \alpha_m$ are parameters, g is a nonlinear function of the Z(k) vector $Z(k)=[z(k-1)\ z(k-2)\ \ldots\ z(k-m)]$, and w(k) denotes white noise. Even though $a_n(k)$ may have a linear model, the prediction on $a_n(k)$ is not adequate in the power control application as the performance of a communication system is described more closely in terms of power in the dB scale than a linear scale, such as on a linear scale the difference between $a_n(k)=0.01$ and $a_n(k)=0.001$ is only 0.009 and may seem small in terms of the estimation and prediction. However, the difference in terms of dB values is 20 dB, which more truly describes the difference in performance of the communication system if the channel gain of 0.001 is incorrectly estimated as 0.01. Thus, modeling in terms of dB values accentuates the estimator and predictor errors in a desired manner and the parameter estimation and adaptive calculator 58 is based on the estimation of z(k) rather than $a_n(k)$. However, the appropriate model for the process z(k) is a nonlinear model of Z(k). Moreover, when modeling the channel in terms of z(k), the model of the communication system for the purpose of solving the power control problem can be described by an adaptive predictor of FIG. 2.

The noisy estimate of the received power level at the receiver at the sampling time instance $(k+N_{D1})$ denoted by $\psi(k)$ is $\psi(k)=z(k)+u(k)+v(k)$ where v(k) is the error incurred in the measurement of the power level received by the uplink receiver. Both the forward channel from the transmitter to the receiver and the reverse channel from the receiver to transmitter, together introduce a roundtrip delay of $N_D$ samples. This propagation delay is lumped together into one element without making any difference in the results when the channel is modeled by Z(k). For the case of satellite communication, one sample delay may correspond to 10 msec or higher and the propagation time will be known with much higher accuracy. Alternatively, the delay $N_D$ may be estimated from the signal. Thus, from the received signal power estimate $\psi(k-N_D)$ at time k, the transmitter can evaluate the noisy measurement of the channel gain $z_n(k-N_D)$ at time k by $z_n(k-N_D)=z(k-N_D)+v(k-N_D)=\psi(k-N_D)-u(k-N_D)$ as the receiver already has the knowledge of $u(k-N_D)$. The task of the predictor at the transmit site is to predict z(k) on the basis of the sequence of noisy measurements $\{z_n(j), j=k-N_D, k-N_D-1, \ldots\}$. Denoting such a prediction by $\hat{z}_p(k)$, then the required control input is $u(k)=u_{ref}-\hat{z}_p(k)$ where $u_{ref}$ denotes the reference input. The term referred to as the reference input, in the control systems terminology, represents the desired received power at the input to the receiver. Similarly the term control input represents the transmitted power in the present application and the noisy estimate of the received power $\psi(k)$ is referred to as the noisy measurement in the control terminology. In terms of the prediction, the model parameters in z(k) are unknown and may be slowly varying with time. Therefore, an adaptive predictor is used.

In the adaptive predictor, the term $\hat{z}_p(k)$ denotes the predicted value of the channel gain. When the measurement noise v(k) is considered negligible, z(k) is observable and a general form of the predictor is $\hat{z}_p(k)=h(z(k-N_D), \ldots, z(k-N_D-N))$ for an appropriate function h and an integer N. A specific form of the predictor is $\hat{z}_p(k)=\alpha_1 z_D(k-1)+\ldots+\alpha_{N_L} z_D(k-N_L)+\beta_1 z_D^s(k-1)+\ldots+\beta_N z_D^2(k-N)+\gamma_1 z_D^3(k-1)+\ldots+\gamma_{N_L} z_D^3(k-N)+\delta_1 f(z_D(k-1))+\ldots+\delta_N f(z_D(k-N))$, where $z_D(j)=z(j-N_D+1)$ for any integer j; $\alpha$, $\beta$, $\gamma$, and $\delta$s are parameters; N and $N_L$ are integers and the function f( ) is $f(x)=sgn(x)exp(0.01|x|)$ where sgn denotes the signum function. The specific predictor model $\hat{z}_p(k)$ is generated by optimization and may be applied to most power control situations where only the linear and quadratic terms are sufficient for less severe fading environment, while in even more severe fading environments, additional higher order terms may be used. The parameters N and $N_L$ may be different, for example, N may be equal to 4 with $N_L$ equal to 8. The parameters $\alpha$, $\beta$, $\gamma$, and $\delta$ in the specific predictor model are evaluated by an adaptive algorithm. So as to describe the adaptive algorithm let $\theta$ represent the parameter vector $\theta=[\alpha_1 \ldots \alpha_{N_L}, \beta_1 \ldots \beta_N, \gamma_1 \ldots \gamma_N, \delta_1 \ldots \delta_N]$. Then, the predictor model may be described in a compact form $\hat{z}_p(j)=\theta^T x(j)$, where $x(j)=[z_D(j-1) \ldots z_D(j-N_L) \ldots z_D^2(j-1) \ldots z_D^2(j-N) \ldots f(z_D(j-1)) \ldots f(z_D(j-N))]$. The parameter vector $\theta$ can be estimated at time k by minimizing the least squares estimate J where $J=\Sigma_{-\infty}^k |z(j)-\hat{z}_p(j)|^2$. However, to take into account the slowly time-varying nature of the parameter vector $\theta$, an exponentially data weighted least-squares index $J_m$ is minimized with respect to $\theta$ where $J_m=\Sigma_{-\infty}^k \lambda^{k-j}|z(j)-\theta^T x(j)|^2$, where $\lambda$ is the exponential data weighting factor with $0<\lambda<1$. The recursive solution of the optimization problem known as the exponentially data weighted recursive least squares algorithm is given by $\hat{\theta}(k)=\hat{\theta}(k-1)+[P(k-1)x(k)/\mu(k)][z(k)-\hat{\theta}^T(k-1)x(k)]$, where $\mu(k)=\lambda+x^T(k)P(k-1)x(k)$, and $P(k)=[P(k-1)-P(k-1)x(k)x^T(k)P(k-1)\mu(k)]/\lambda$, for $\{k=1, 2, \ldots\}$, with initial conditions for $\hat{\theta}(0)$ and P(0). For example, $\lambda$ may be equal to 0.9999, and the initial conditions for $\hat{\theta}(0)$ and P(0) may be $\hat{\theta}(0)=[10 \ldots 0]^T$ and $P(0)=(0.01)I(n,n)$ where I(n,n) is an n×n identity matrix and n is the dimension of the parameter vector $\theta$ equal to $(N_L+3N)$. The predictor for $z(k+N_D)$ is denoted by $\hat{z}_p(k+N_D)$ and is obtained by replacing $\theta$ by the estimate $\hat{\theta}(k)$ and is given by the prediction equation $\hat{z}_p(k+N_D)=z(k+N_D/k)=\hat{\theta}^T(k)x(k+N_D)$, where $x(k+N_D)$ is obtained by replacing j with $k+N_D$ from the compact predictor model. Both $\hat{\theta}(k)$ and $x(k+N_D)$ are available at time k as both $\hat{\theta}(k)$ and $x(k+N_D)$ depend only upon z(k) and measurements prior to k. In this manner, there is a time lag of $N_D$ samples between the estimate of $\theta$ and the prediction $\hat{z}_p(k)$. However, because the variation in the channel parameter vector $\theta$ is negligible over a period of $N_D$ samples, the effect of such a lag time is negligible. In the ideal case, when the model describing the channel gain variations is time-invariant, the parameter vector $\theta$ is a constant. The control input u(k) is obtained from $\hat{z}_p(k)$ as $u(k)=u_{ref}-\hat{z}_p(k)$, with $\hat{z}_p(k)$ obtained by the adaptive prediction algorithm.

The measurement of the received signal power level is at any discrete time instance k. The receiver has a time constant equal to the sample period which may be 10.0 msec or higher in the case of the geostationary satellite channels for providing an accurate estimate of the average received power level during that period. Thus, in the measurement $z_n(k)=z(k)+v(k)$, the variance of v(k) will be negligible. However, the effect of v(k) can be further reduced by the predictor by introducing a smoothing filter 52 to reduce the noise in $z_n(k)$. In the state vector x(k) of the $\hat{z}_p(k)$ predictor equation and in the $\hat{\theta}(k)$ of the parameter estimation algorithm, z(k) is replaced by a filtered estimate $z_F(k)$, while in the prediction error equation $[z(k)-\hat{\theta}^T(k-1)x(k)]$ of the RLS algorithm, z(k) is replaced by $z_n(k)$. As such, a first order filter may be used where $z_F(k)=\lambda_F z_F(k-1)+(1-\lambda_F)z_n(k)$ for $\{k=0, 1, 2 \ldots\}$, with $\lambda_F=0.8$. Such a filter may introduce some delay, however this filter delay is automatically taken in to account in the predictor. Other types of filters may also be used instead of a first order filter. The filter and adaptive predictor includes a smoothing filter 52 to derive the filtered estimate $z_F(k)$ from the received noisy measurements $z_n(k)=z(k)+v(k)$. The parameter estimation and adaptive calculator 58 provides $\hat{\theta}(k-N_D)$ from the RLS algorithm. The nonlinear predictor 62 implements the $\hat{z}_p(k+N_D)$ prediction by the predictor equation.

For the performance evaluation, channel gain variations are modeled by a random process obtained by a complex white noise process filtered by a Butterworth filter of some specified bandwidth and order. Thus, the real envelope of the channel gain $a_n(k)$ at discrete time k is $a_n(k)=\sqrt{[x_{nf}^2(k)+y_{nf}^2(k)]}$, where each of the processes $x_{nf}(k)$ and $y_{nf}(k)$ are obtained by filtering a white Gaussian noise sequence of zero mean and variance $\sigma_p^2$ by a specified filter. In the simulation examples, the filter is selected to be a third order Butterworth filter of 3 dB normalized bandwidth $B_{pn}$ equal to 0.01 where the normalized bandwidth $B_{pn}=(2B_p/f_s)$ where $B_p$ is the filter bandwidth in Hz and $f_s$ is the sampling rate of the discrete-time process. For example with $B_p=0.1$ Hz for modeling the satellite channel, and $B_{pn}=0.01$ corresponds to $f_s$ equal to 20 Hz. This corresponds to a sampling interval of 50 msec, about 1/10th of the delay encountered in the round trip geosynchronous satellite channel. On the other hand for a terrestrial mobile communication channel $B_p$ may be of the order of 100 Hz which corresponds to a sampling interval of 50 μsec for the same $B_{pn}=0.01$. In this case the sampling interval is of the order of the maximum propagation delay likely to be encountered in the terrestrial cellular networks. Thus the propagation delay in most of the channels is estimated to be between 1 to 10 sampling intervals in the model used. The envelope $a_n(k)$ has a Rayleigh distribution with its second moment equal to $2\sigma_{pf}^2$ where $\sigma_{pf}^2$ is equal to the variance of each of the filtered processes $x_{nf}(k)$ and $y_{nf}(k)$ and is given approximately by $\bar{a}_n^2 = \sigma_{pf}^2 \cong 2B_{pn}\sigma_p^2$, where $\bar{a}$ is the expected value of a for any a.

From the simulations the time average of $a_n^2(k)$ is equal to 0.0077. The time average value of $20\log(a_n(k))$ is equal to $-23.36$ dB as compared to the value $20\log(0.0077)=-21.14$ dB. When the transmitter power level is selected so that the mean received power level is 0 dBW in the absence of any power control, the rms value σ of the signal power in dB is equal to 6.48 dB. The power level distribution is skewed and has significant probability of signal power level being 30.0 dB or more below the mean as is well known for the Rayleigh fading channel. From the cumulative distribution function of the received power level without power control, the power levels for the 1%, 10%, 90% and 99% probability values are equal to $-17.86$ dBW, $-7.44$ dBW, 6.08 dBW and 9.01 dBW respectively. The pdf of the envelope $a_n(k)$ is obtained by a histogram with one million sample points and is close to the probability density function of a Rayleigh distributed random variable.

The power control algorithm can be combined with diversity combining techniques with L diversity branches to further improve the power control performance. The diversity techniques may be classified into three main classes. In the explicit transmit-receive diversity, the transmit power in each of the L diversity channels can be individually controlled. Examples of such techniques are the frequency diversity and polarization diversity techniques. The second class of techniques is the receive only diversity wherein there is only one transmitter but L receivers. In this second class, the power in different diversity channels cannot be individually controlled, however each diversity signal is individually available from which the received power level over different diversity paths can be ascertained. An example of this second class of techniques is L receive antennas that are physically separated by a predetermined distance. The third class of the diversity techniques is the class of implicit diversity techniques. An implicit diversity is a special case of the receive only diversity case with the difference that no explicit resources, such as multiple receive antennas, are required. The diversity is achieved by separating the single received signal on the basis of signal parameters. For example, in the rake receiver applicable for the spread spectrum signals, the signal is separated on the basis of propagation delays encountered, such as when the signal propagates over multiple paths, which have significant difference in respective propagation delays. The power control techniques can be combined with various diversity methods in order to achieve high performance.

In the case of explicit transmit-receive diversity, the power control algorithm operates independently on the various diversity channels. The signals from various diversity channels under power control are then combined at the receiver using any one the traditional combining techniques such as switched, equal gain combining, or the maximal ratio combining technique. For the explicit or implicit receive only diversity, the receiver measures the power level in each of the diversity channels and transmits power information to the transmitter. The transmitter then applies the adaptive prediction algorithm to each of the channels individually and computes the required control input for each of the diversity channels. The actual control input, that is, the transmit power, is then determined from the computed controls according to predetermined criteria, such as, $u^i(k)$ being the control input computed from the adaptive predictor algorithm for the ith diversity channel, then the actual control of the transmit power level is determined as $u(k)=F[u^1(k),u^2(k),\ldots,u^L(k)]$ for the function F. For example, F may be the minimum value of the arguments. Such a selection ensures that at least one of the diversity channels is operating at the desired power level when the prediction error is negligible. The power control for the case of explicit or implicit receive only diversity has control that is equivalently determined from the predicted channel gains $\hat{z}_p^i(k)$ rather than in terms of the computed controls $u^i(k)$; $i=1, 2, \ldots, L$ as is achieved by the prediction selector 50 in FIG. 1. When the algorithm is applied to the channel with the model described, then with $N_D$ equal to 12.0, the received power level has an rms variation of about 1.93 dB as compared to 6.48 dB without power control. Moreover, the 1% and 99% probability values are given by $-6.5$ dBW and 4.58 dBW respectively compared to the $-17.86$ dBW and 9.01 dBW without the power control.

Both the transmit and receive explicit or implicit diversity techniques can be used, such as the dual implicit diversity. In the example of dual diversity, the two channel gain variations are independent random processes and have the same statistics. The control is based on the minimum of the transmit power levels required individually for the two implicit channels so that at least one of the diversity channels has the predicted received power level equal to the desired level $u_{ref}=0$ dBW. The receiver uses a relatively simple switched diversity technique, that is, the receiver uses the channel with the maximum power of the two diversity channels. With two diversity channels, the rms power variation is reduced to 1.38 dB compared to a value of 1.93 dB without diversity. The 1% and 99% values are $-3$ dBW and 4.88 dBW respectively compared to the corresponding values of $-17.86$ dBW and 9.01 dBW respectively without the power control or diversity, thus, improving the 1% probability value, that is the value exceeded with probability of 99%, by 14.86 dB. For the cdf of the received signal power using dual explicit diversity, the 1% value is $-3$ dBW and the 99% value is 4.88 dBW.

For the case of an explicit dual diversity with $u_{ref}=-15$ dBW, wherein each channel power is independently controlled and the receiver uses the diversity channel with the maximum power, thereby implementing the maximum switch diversity, the 1%, 10%, 90%, and 99% probability values of the received power level are equal to $-16.26$ dBW, $-15.28$ dBW, $-13.42$ dBW and $-7.54$ dBW respectively, and the mean power level is equal to $-14.8$ dBW, as compared to the desired value of $-15$ dBW. Thus, with 99% probability, the received power level is above the mean value minus 1.26 dB.

For an implicit triple switched diversity with power control based on the minimum channel gain, the rms power level variation is equal to 0.73 dB with mean power level equal to −14.9 dBW. The mean transmitted power is equal to 4.14 dBW and is smaller than the difference between the mean channel power gain of −23.36 dB and the desired received power level of −15 dBW, which is equal to 8.36 dBW. The difference is the result of the diversity gain and the power control algorithm. In all of these examples, both the parameters $N_L$ and N of the adaptive predictor are selected equal to four and the measurement noise variance has been assumed equal to zero.

Effect of the measurement noise on power control can be determined. There are several possible algorithms for the measurement of the received power level. In one such method, the inphase and quadrature components of the complex envelope of the received signal, after removing the data modulation in a decision directed manner, are averaged over the period $T_s=1/f_s$. The sum of squares of the averaged values then provides the estimate of the received power during the particular $T_s$ second interval. The signal to noise power ratio in the averaged inphase or quadrature components is of the order $(2P/N_0 f_s)$ where P is the signal power level and $N_0$ is the noise power spectral density ratio. Thus, for example, with $(P/N_0)$ equal to 40 dB-Hz and fs equal to 10.0 Hz, the $(2P/N_0 f_s)$ ratio is equal to $2\times 10^3$. With the power normalized to 1.0 Watt, the measurement noise variance is $0.5\times 10^{-3}$. The noise variance $\sigma_n^2$ in the measurement of the channel power gain z(k) is then obtained by multiplying $\sigma_n^2$ by the average channel power gain equal to 0.0077 in the example yielding a value for $\sigma_n^2$ equal to $3.9\times 10^{-6}$. Other measurement algorithms may yield somewhat higher value for $\sigma_n^2$. The values for $\sigma_n^2$ in the examples are in the range of $10^{-6}$ to $10^{-5}$. The effect of the measurement noise can be reduced by a smoothing filter 52. The first order filter will introduce some tracking delay, however the adaptive predictor automatically and implicitly accounts for such a delay in computing the control input. It is in part for this reason that the predictor parameter $N_L$ has been increased to 8 from a value of 4 in the examples with significant measurement noise. The received power level for the case of triple implicit diversity has a measurement noise variance equal to $1.0\times 10^{-5}$. The rms variation of received power with the power control algorithm is equal to 0.87 dB and is marginally higher compared to the value of 0.73 dB for the measurement noise free case.

The performance of the power control algorithm is a function of the delay parameter $N_D$. The received power level has different rms variations as the parameter $N_D$ is varied while keeping all the other parameters same. For the case of $N_D=8$ and with $\sigma_n^2$ equal to $1.0\times 10^{-5}$, the rms power variation is 0.64 dB compared to the case of 0.87 dB for $N_D=12$. The rms power fluctuation for the case of $N_D=6$ is only 0.37 dB. The parameters of the power control algorithm for the case of triple implicit diversity are given by $\lambda_F=0.8$, $N_L=8$, and N=4.

With the same average received power level in both the cases of nonfading and fading channels, wherein for the case of fading diversity channels the received power is measured at the combiner output, the performance of the power control system for $L \geq 2$ is nearly the performance of the nonfading channel. However, due to fading, the power control, and different combining techniques, the average transmitted power level may be different even for the same received power level in the two cases. A power control and diversity power table lists various power levels for the case of L=1 and L=2, and L=3.

Power Control and Diversity Power Table

| L | Measured | Average Power (dBW) | Average of dBW Power |
|---|---|---|---|
| 1 | Transmit Power $P_T$ | 11.81 | 7.79 |
|   | Received Power $P_R$ | −14.81 | −14.99 |
| 2 | Transmit Power $P_R$ | 7.55 | 5.44 |
|   | Ch1 Received Power $P_{R1}$ | −16.62 | −18.09 |
|   | Ch2 Received Power $P_{R2}$ | −16.58 | −18.17 |
|   | Combined Power Switched | −14.97 | −15.00 |
|   | Combined Power Equal Gain | −14.01 | −14.26 |
|   | Combined Power (maximal) | −13.59 | −13.70 |
| 3 | Transmit Power $P_T$ | 5.13 | 3.99 |
|   | Ch1 Received Power $P_{R1}$ | −17.27 | −19.07 |
|   | Ch2 Received Power $P_{R2}$ | −17.47 | −19.38 |
|   | Received Power $P_{R3}$ | −17.55 | −19.56 |
|   | Power (switched) | −15.01 | −15.02 |
|   | Combined Power (equal gain) | −13.24 | −13.49 |
|   | Combined Power (maximal ratio) | −12.66 | −12.78 |

For the case of AWGN channel, the transmit power is 5.65 dBW, which is equal to the required received power of −15 dBW minus the average of the channel power gain equal to −20.65 dB. In comparing the performance in terms of the transmitted power level, the average transmitted power level for the power control system is selected to be the same for the fading channel with and without any power control and for the AWGN channel. Thus, in making the transmit power the same as for the AWGN channel, the transmit power is reduced below those given by Table 1 and brought to the same 5.65 dBW level in all cases.

With implicit diversity, the average transmit power is measured in a single channel as there is only one transmitter for the case of implicit diversity, and is set equal to the transmit power required for the ideal AWGN channel. The diversity combining technique is selected to be the optimum maximal ratio combining for the case of no power control whereas switched or equal gain non-optimum combining is used for the case of power control in this example. The comparison shows that for the case of L=3, the residual degradation is negligible when using power control. However, when no power control is used, about 7.0 dB degradation results at a probability error of $10^{-6}$.

When the maximal ratio combining is used along with power control, the performance of the diversity technique with power control is better than the AWGN of a nonfading channel by about 1.7 dB for a probability error of $10^{-5}$. This gain arises due to the increased power available in the diversity channel. When the diversity gain is included in the AWGN channel, the performance of the AWGN channel will also improve by about 4.7 dB. Thus, when compared to a theoretical case when three explicit diversity channels are used for the nonfading channel, the net loss is about 3 dB. In contrast to this at a probability error of $10^{-6}$, diversity combining without power control requires about 8.5 dB higher $(E_b/N_0)$ than when power control is used and when the maximal ratio combining is used in both the cases.

Unequal power in the diversity channels provides other examples of the power control. When different diversity channels have unequal channel gains, the average relative gains for the three diversity channels are selected as [0, −3, −5] dB in one of the examples. Even in this case, the performance of the diversity system with power control stays close to that of an ideal channel for a probability error equal to $10^{-6}$ or worse. In the absence of power control, the performance is worse by about 7 dB for a probability error equal to 10. An L=3 at [0, −3 −5] dB power control and diversity power table indicates various power levels when the combined received power level is desired to be −15 dBW for the case of triple implicit diversity. Similarly an L=2 @[0, −3] dB power control and diversity power table indicates various power levels when the combined received power level is desired to be −15 dBW for the case of dual implicit diversity. However, in comparing the performance with the non fading channel case, the transmit power level is reduced to make it equal to the power transmitted for the AWGN channel with the channel power gain equal to the average power gain of the fading channel with 0 dB relative power level.

L = 3 at [0 −3 −5] dB Power Control and Diversity Power Table

| Power Measured | Average Power (dBW) | Average of dBW Power |
| --- | --- | --- |
| Transmit Power $P_R$ | 7.56 | 6.24 |
| Ch1 Received Power $P_{R1}$ | −16.20 | −17.30 |
| Ch2 Receiver Power $P_{R2}$ | −17.96 | −20.29 |
| Ch3 Received Power $P_{R3}$ | −19.36 | −22.36 |
| Combined Power (switched) | −15.00 | −15.02 |
| Combined Power (equal gain) | −13.57 | −13.90 |
| Combined measured (maximal ratio) | −12.88 | −13.02 |

L = 2 @ [0, −3] dB Power Control and Diversity Power Table

| Power Measured | Average Power (dBW) | Average of dBW power |
| --- | --- | --- |
| Transmit Power $P_T$ | 8.80 | 6.71 |
| Ch1 Received Power $P_{R1}$ | −15.71 | −16.53 |
| Ch2 Received Power $P_{R2}$ | −17.81 | −20.08 |
| Combined Power (switched) | −14.94 | −14.98 |
| Combined Power (equal gain) | −14.08 | −14.35 |
| Combined Power (maximal Ratio) | −13.63 | −13.75 |

The power control algorithm can be evaluated after averaging the performance over the complete duration of fading. However, under fading situations, it may be adequate to achieve a specified probability error only over a certain specified percentage of time. Such percentage of time is termed as the availability and may be specified to be between 99% and 99.9%, that is, less than 100% availability. With $P_a$ denoting the availability as a fraction between zero and one, then the probability of error $(P_e)$ with availability $P_a$ is denoted by $P_{e,a}$. The term $P_{e,a}$ is the average of the probability of error averaged over $100 \times P_a$ of the time. With dual diversity and power control, the performance is close to that of the AWGN channel 99.9% of the time with a degradation of less than 1 dB at $P_{e,a}=10^{-6}$. The degradation is smaller at higher values of $P_{e,a}$. By comparison, without power control and no diversity, $P_{e,a}$ is approximately equal to 0.1 even at $(E_b/N_0)$ of 15 dB. With power control, even without diversity, $P_{e,a}$ is in the range of $10^{-3}$ to $10^{-2}$, as is required with coded systems, and can be obtained with reasonable values of $E_b/N_0$.

In the case of CDMA systems, the performance is determined primarily by the self noise of the system and a few dB increase in the transmitted power level may be insignificant. In this case, the results should be compared on the basis of the total received power level rather than in terms of the transmitted power. In that case, there is no significant performance degradation in comparison to AWGN channel when L≥2. Also for the case of L=1, the degradation is smaller than a dB for $P_e \geq 10^{-3}$.

The power control system of the invention can be applied to all fading communication channels involving significant propagation delays, such as satellite channels. The power control system also provides improvement to the performance of the terrestrial communication systems such as CDMA cellular networks by taking into account the propagation delay and other nonideal effects in the adaptive algorithm. Besides communication systems, power control can be used in other systems, such as, command and tracking systems. The power control determines the transmitted power on the basis of a measurement of the received power levels over the individual diversity branches. Using power control, the overall performance is very close to the performance of a system without any fading. For example, when dual or triple diversity is used with equal power over all the diversity branches, the performance is within a fraction of a dB of the performance of a nonfading channel for a $P_e$ of $10^{-6}$ or higher. The receiver can use a simpler switched diversity combining with the average received power level at the diversity combiner output equal to the power level for the nonfading case. The residual loss due to fading is about 1 dB for the switched diversity with a $P_e$ of $10^{-6}$ or higher. In the CDMA systems, the total received power from all users is used in determining the system performance rather than the transmitter power level, such as the ground terminal power level in the case of uplink, as in these systems, when the thermal noise is insignificant as compared to the self noise, then only the relative power level of various users at the receiver input is important and not how much power needs to be transmitted to achieve such a relative power level. For example, all of the transmitters in the CDMA system may change their power level by a constant factor without changing the performance as long as the thermal noise power remains negligible. Thus the criteria used in this example seems to be the most applicable to the CDMA systems and the penalty for fading is reduced to about 1 dB for a $P_e$ of $10^{-6}$ or higher when switched combining is used with L=2 or 3. The difference is negligible when a more optimal combining technique, such as equal gain or maximal ratio combining is used, showing that in the CDMA systems operating in the self-interference dominated regime, the power controlled architecture and algorithm completely eliminate any degradation in performance due to channel fading even when significant round trip delay is incurred in the channel measurements.

In TDMA and FDMA systems, which are not self-interference limited, performance improvements may be on the basis of the total power transmitted. Such a comparison naturally includes the loss in the fading channel, where higher transmission power is necessary to counter higher losses in the channel in order to receive the same average receive power in both the fading and nonfading channels. In this comparison for the case of equal average power over all diversity channels, the average transmitted power over any of the diversity channels is set equal to the power transmitted over the nonfading channel and then the $P_e$ is compared for the two cases. For the case of L=3 and using maximum switch diversity or equal gain combining, the fading channel case is slightly better than the AWGN case, which is the reference nonfading channel case without diversity, for a $P_e$ equal to $10^{-6}$ or worse, and is slightly worse for lower value of $P_e$. If the maximal ratio combining is used, the result is better than the AWGN case by about 1 dB for a $P_e$ equal to $10^{-8}$ or higher. For the case of dual diversity, there is a degradation of about 2 dB for a $P_e$ equal to $10^{-8}$ or higher.

As another example, when the average power received over different diversity channels is different due to different diversity channel power gains, the relative residual degradation due to fading is relatively small. For example, with relative power levels of [0 −3 −5] dB over the three diversity channels, the performance is within 1 dB of the performance of the AWGN channel for a $P_e$ equal to $10^{-6}$ or higher.

With power control and explicit or implicit diversity, the residual loss due to fading can be made negligible. The residual loss occurs due to the outliers present in the probability density function of the received power level. The received power level averaged over a sampling period $T_s$ under the power control is within 1 dB or smaller of the mean power level with high probability even without any diversity. There are however occasional outliers such that the instantaneous power can deviate from the mean significantly albeit with a relatively small probability. In fading channels, the performance is often specified in terms of the link availability. For example, the specification may be a $P_e$ value of $10^{-5}$ with at least 99.9% availability. If availability is interpreted as the period excluding the period when the outliers are present, then a comparison of the performance can also be made on that basis. As an example of such a comparison, the performance of the dual diversity fading channels is within 1 dB of the AWGN case with an availability of 99.9% even when the comparison is made on the basis of the transmitted rather than the received power level. As an interesting comparison, the dual diversity system without power control requires about 7 dB higher $(E_b/N_0)$ than the AWGN case for a $P_e$ equal to $10^{-4}$ or higher even with a 99% availability. A $P_e$ in the range of $10^{-6}$ or lower, is not achievable with any reasonable value of $(E_b/N_0)$ with dual diversity and without power control.

For the TDMA and FDMA systems, wherein the comparison is performed in terms of the transmitted power rather than the received power, triple diversity results in the same or better performance than the AWGN channel case for a $P_e$ of $10^{-8}$ or higher. The residual penalty for the dual diversity case is about 2 dB for relatively low values of $P_e$ of $10^{-6}$ even when the relative power level of the diversity channel is 3 dB smaller than the main channel, and much smaller for higher values of $P_e$. Without any diversity present, a similar insignificant penalty results but with less than 100% availability, for example, a 99.9% availability. Note that for the coded systems, a relatively higher value of $P_e$ of $10^{-2}$ to $10^{-3}$ is of interest whereas for the uncoded systems, a lower value of $P_e$ in the range $10^{-6}$ to $10^{-8}$ is generally required. For the CDMA systems, without any diversity, the residual penalty is reduced to less than 1 dB for a $P_e$ of $10^{-3}$ or higher with the power control algorithm of the paper. The residual penalty due to fading is reduced to a negligible value when a second order explicit or implicit diversity is available. Such results are achieved even in the presence of significant round trip propagation delay incurred in obtaining the received power level measurements at the transmitter with Rayleigh fading, which is relatively worse case of fading. For other less severe fading conditions such as the Rician fading, the performance may be further improved. Those skilled in the art can make enhancements, improvements, and modifications to the invention, and these enhancements, improvements, and modifications may nonetheless fall within the spirit and scope of the following claims.

What is claimed is:

1. A system for maintaining constant power levels of received uplink signals communicated through an uplink channel having a time variable channel gain, the system comprising, an uplink transmitter for transmitting uplink signals through the uplink channel, the uplink signals having an adjusted power level adjusted by an adaptive power reference, an uplink receiver for receiving the uplink signals as the received uplink signals and for generating power measurement signals, a downlink transmitter for transmitting downlink signals through a downlink channel, the downlink signals containing the power measurement signals, a downlink receiver for receiving the downlink signals and for generating received power measurement signals, and a power controller for receiving a power reference and the received power measurement signals and for generating the adaptive power reference through a prediction of the time variable channel gain at a future time defined by a round trip time delay between transmitting the uplink signals and receiving the downlink signals.

2. The system of claim 1 wherein,
the uplink channel and downlink channel are the downlink channel and the uplink channel, respectively.

3. The system of claim 1 wherein,
the round trip delay time is predetermined.

4. The system of claim 1 for further determining the round trip delay time from the generation of the uplink signal and reception of the downlink signals.

5. The system of claim 1 wherein the power controller comprises, a controller delay for delaying the adaptive power level reference by the round trip time delay for generating a delayed adaptive power reference signal, an adder for subtracting the delayed adaptive power reference from the received power measurement signals for generating adaptive power measurement signals, a predictor for receiving the adaptive power measurement signals and generating a predicted adaptive power reference signal, and an adder for subtracting the predicted adaptive power reference signal from the power reference for generating the adaptive power reference.

6. The system of claim 5 wherein the predictor comprises,
a first delay line for receiving the adaptive power measurement signals and generating first delay line adaptive power measurement signals, a predictor delay for delaying by the round trip time delay the adaptive power measurement signals into delayed adaptive power measurement signals, a second delay line for receiving the delayed adaptive power measurement signals and generating second delay line adaptive power measurement signals, a calculator for receiving the adaptive power measurement signals and second delayed adaptive power measurement signals for generating parameters modeling gain variations of the time varying channel gain, and a nonlinear predictor for receiving the parameters and the first delay line adaptive power measurement signals for generating the predicted adaptive power measurement signals.

7. The system of claim 5 wherein the predictor comprises,
a smoothing filter for filtering the adaptive power measurement signals into filtered adaptive power measurement signals, a first delay line for receiving the filtered adaptive power measurement signals and generating first delay line adaptive power measurement signals, a predictor delay for delaying by the round trip time delay the filtered adaptive power measurement signals into delayed adaptive power measurement signals, a second delay line for receiving the delayed adaptive power measurement signals and generating second delay line adaptive power measurement signals, a calculator for receiving the adaptive power measurement signals and the filtered adaptive power measurement signals and the second delayed adaptive power measurement signals for generating parameters modeling gain variations of the time varying channel gain, and a nonlinear predictor for receiving the parameters and the first delay line adaptive power measurement signals for generating the predicted adaptive power measurement signals.

8. The smoothing filter of claim 7 wherein,
the smoothing filter is a first order recursive filter.

9. The predictor of claim 7 wherein,
the calculator applies an exponentially data weighted recursive least square algorithm upon a state vector comprising the exponential powers of the second delay line adaptive power measurement signals and the filtered adaptive power measurement signals and the adaptive power measurement signals for generating the parameters for defining in a logarithmic scale the time varying channel gain in logarithmic scale, the parameters being recursively updated over time.

10. The nonlinear predictor of claim 7 wherein,
the calculator applies an exponentially data weighted recursive least square algorithm upon a state vector comprising the exponential powers of the second delay line adaptive power measurement signals and the filtered adaptive power measurement signals and the adaptive power measurement signals for generating the parameters for defining in a logarithmic scale the time varying channel gain in logarithmic scale, the parameters being recursively updated over time, and the predictor predicts the predicted adaptive power reference level by computing an inner product of a parameter vector defined by the parameters and a state vector comprising exponential powers of the first delay line adaptive power measurement signals.

11. The system of claim 1 wherein the power controller comprises, a controller delay for delaying the adaptive power level reference by the round trip time delay for generating a delayed adaptive power reference signal, adders for respectively subtracting the delayed adaptive power reference from the received power measurement signals for generating respective adaptive power measurement signals, a bank of predictors for respectively receiving the adaptive power measurement signals and generating respective predicted adaptive power reference signals, a selector for selecting one of the predicted adaptive power reference signals as a selected predicted adaptive power reference signal, and an adder for subtracting the selected predicted adaptive power reference signal from the power reference for generating the adaptive power reference.

12. The system of claim 11 wherein,
the selected predicted adaptive power reference signal is a one of the predicted adaptive power measurement signals, the selection a selection function selected from the group consisting of maximum, minimum, average, and weighted average.

13. The bank of predictors of claim 11, wherein each of the predictors receives one of the adaptive power measurement signals as an adaptive power measurement signal, each of the predictors comprises, a first delay line for receiving the adaptive power measurement signals and generating first delay line adaptive power measurement signals, a predictor delay for delaying by the round trip time delay the adaptive power measurement signals into delayed adaptive power measurement signals, a second delay line for receiving the delayed adaptive power measurement signals and generating second delay line adaptive power measurement signals, a calculator for receiving the adaptive power measurement signals and second delayed adaptive power measurement signals for generating parameters modeling gain variations of the time varying channel gain, and a nonlinear predictor for receiving the parameters and the first delay line adaptive power measurement signals for generating the predicted adaptive power measurement signals.

14. The bank of predictors of claim 11, wherein each of the predictors receives one of the adaptive power measurement signals as an adaptive power measurement signal, each of the predictors comprises, a smoothing filter for filtering the adaptive power measurement signals into filtered adaptive power measurement signals, a first delay line for receiving the filtered adaptive power measurement signals and generating first delay line adaptive power measurement signals, a predictor delay for delaying by the round trip time delay the filtered adaptive power measurement signals into delayed adaptive power measurement signals, a second delay line for receiving the delayed adaptive power measurement signals and generating second delay line adaptive power measurement signals, a calculator for receiving the adaptive power measurement signals and the filtered adaptive power measurement signals and the second delayed adaptive power measurement signals for generating parameters modeling gain variations of the time varying channel gain, and a nonlinear predictor for receiving the parameters and the first delay line adaptive power measurement signals for generating the predicted adaptive power measurement signals.

* * * * *